(12) United States Patent
Defrain et al.

(10) Patent No.: US 11,078,349 B2
(45) Date of Patent: Aug. 3, 2021

(54) CURABLE LOW SULFUR LIQUID RUBBER COMPOSITIONS

(71) Applicant: Fina Technology, Inc., Houston, TX (US)

(72) Inventors: Olivier Defrain, Gavisse (FR); Olivier Klein, Freyming-Merlbach (FR)

(73) Assignee: Fina Technology, Inc., Houston, TX (US)

( * ) Notice: Subject to any disclaimer, the term of this patent is extended or adjusted under 35 U.S.C. 154(b) by 280 days.

(21) Appl. No.: 16/393,493

(22) Filed: Apr. 24, 2019

(65) Prior Publication Data

US 2020/0339786 A1 Oct. 29, 2020

(51) Int. Cl.
*C08L 9/00* (2006.01)
*C08C 19/00* (2006.01)

(52) U.S. Cl.
CPC .............. *C08L 9/00* (2013.01); *C08C 19/00* (2013.01); *C08L 2312/00* (2013.01)

(58) Field of Classification Search
CPC ..... C08L 9/00; C08L 2312/00; C08L 2312/02
See application file for complete search history.

(56) References Cited

U.S. PATENT DOCUMENTS

| | | | |
|---|---|---|---|
| 3,083,175 A | 3/1963 | Safford et al. | |
| 6,245,861 B1 | 6/2001 | Class | |
| 6,361,643 B2 | 3/2002 | Born et al. | |
| 7,655,739 B1 | 2/2010 | McPhee et al. | |
| 8,137,500 B2 | 3/2012 | Sauer et al. | |
| 9,493,687 B2 | 11/2016 | Sauer et al. | |
| 2001/0044503 A1 | 11/2001 | Born et al. | |
| 2008/0293852 A1 | 11/2008 | Gronowski et al. | |
| 2012/0136129 A1* | 5/2012 | Kohlstrung | C08K 5/0025 526/220 |
| 2017/0267842 A1* | 9/2017 | Ohkubo | G10K 11/16 |
| 2020/0317904 A1* | 10/2020 | Defrain | C08F 212/08 |

FOREIGN PATENT DOCUMENTS

| | | | | |
|---|---|---|---|---|
| CA | 2544592 A1 * | 5/2005 | | B60C 1/0016 |
| CN | 106867628 A | 6/2017 | | |
| EP | 3231839 A1 | 10/2017 | | |
| GB | 1222573 | 2/1971 | | |
| JP | 5975932 A | 4/1984 | | |
| JP | 2011046795 A | 3/2011 | | |

(Continued)

OTHER PUBLICATIONS

Henning et al., "Fundamentals of Curing Elastomers with Peroxide and Coagents", Rubber World, Feb. 2006—pp. 28-35.

(Continued)

*Primary Examiner* — Mark S Kaucher
(74) *Attorney, Agent, or Firm* — Albert Shung

(57) ABSTRACT

A curable low sulfur liquid rubber composition including at least one polymer which contains, in polymerized form, at least one monomer having a carbon chain of four and a peroxide system which includes at least one organic peroxide and at least one coagent. The polymer has a vinyl content of 1% to 90% and a number average molecular weight of 800 g/mol to 70,000 g/mol. The curable low sulfur liquid rubber composition has a sulfur content of 0 to 1%, by weight, and is curable at a temperature of 100° C. to 190° C.

22 Claims, 1 Drawing Sheet

(56) References Cited

FOREIGN PATENT DOCUMENTS

| | | |
|---|---|---|
| JP | 2011057776 A | 3/2011 |
| JP | 2011144321 A | 7/2011 |
| JP | 2012117004 A | 6/2012 |
| JP | 2013155291 A | 8/2013 |
| JP | 5445158 B2 | 3/2014 |
| JP | 5459189 B2 | 4/2014 |
| JP | 5898977 B2 | 4/2016 |
| WO | 2015062054 A1 | 5/2015 |
| WO | 2105089807 A1 | 6/2015 |
| WO | 2016094161 A1 | 6/2016 |
| WO | 2017164412 A1 | 9/2017 |
| WO | 2018109376 A1 | 6/2018 |

OTHER PUBLICATIONS

Hergenrother, W., "Characterization of Networks form the Peroxide Cure of Polybutadiene. II. Kinetics and Sol-Gel", Journal of Polymer Science, Polymer Chemistry, vol. 11, 1973—pp. 1721-1732.

Okaya et al., "Vulcanization of Liquid Polybutadiene (III) Peroxide Vulcanization of Liquid Polybutadienes", Polymer Research & Development Laboratory Nisso Chemical Co., Ltd., vol. 48, No. 11, 1975, with partial translation—pp. 705-715.

Sadeghi et al., "Determination of the Microstructure of Polybutadiene-ol Back-bone by FTIR and NMR Spectroscopy", Iranian Polymer Journal, vol. 12, No. 6, 2003—pp. 515-521.

International Search Report Issued for International Application No. PCT/US2019/015147, dated May 8, 2019, 9 pages.

Non Final Office Action for U.S. Appl. No. 15/935,262, dated Aug. 22, 2019, 21 pages.

International Search Report and Written Opinion for International Application No. PCT/US2020/029615, dated Aug. 13, 2020, 11 pages.

International Preliminary Report on Patentabiity and Written Opinion for International Application No. PCT/US2019/015147, dated Sep. 29, 2020, 6 pages.

Sadeghi et al., "Determination of the Microstructure of Polybutadiene-ol Back-bone by FTIR and NMR Spectroscopy", Iranian Polymer Journal, 12(6), 2003—pp. 515-521.

Dluzneski, P.R., "Peroxide Vulcanization of Elastomers," Rubber Chemistry and Technology, vol. 74 (2001), pp. 451-492.

Khoee, S., et al., "Microstructure Analysis of Brominated Styrene-Butadiene Rubber," 2007, pp. 87-94, Polymer Engineering and Science.

Henning et al., "The Synthesis and Characterization of Farnesene-based Polymers", presented at the Fall 190th Technical Meeting of Rubber Division, ACS, Cleveland, Ohio, Oct. 11-13, 2016—32 pages.

\* cited by examiner

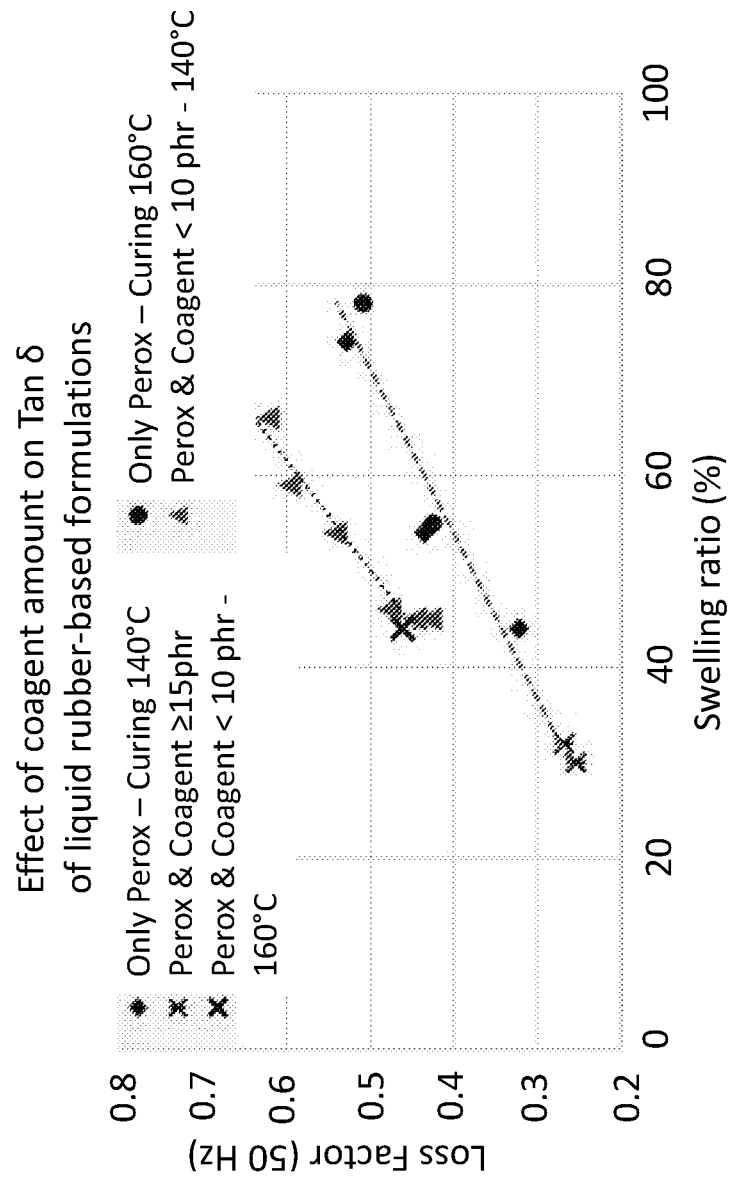

CURABLE LOW SULFUR LIQUID RUBBER COMPOSITIONS

FIELD OF THE INVENTION

Aspects of the invention are directed to curable low sulfur liquid rubber compositions and, particularly, to low sulfur liquid rubber compositions that are curable with a peroxide system as well as methods of manufacturing the same. The present invention is directed to curable liquid polyene rubber-based compositions intended to optimize the hardness/damping performance of materials to seal or to reduce acoustic noise for automotive and transportation industries. These compositions are based on liquid polyene rubber(s) and contain a crosslinking system comprising at least one organic peroxide and at least one coagent.

BACKGROUND OF THE INVENTION

Liquid rubber compositions are commonly used as adhesives, sealants, and/or sound dampening materials in the automotive industry. Such compositions are referred to as "liquid rubber compositions" because they contain one or more polyene polymers which are pourable and/or sprayable at temperatures of 100° C. or lower but which are capable of being cured by crosslinking reactions to provide solid elastomeric compositions. The crosslinking agent for these compositions has generally been sulfur or a sulfur compound. For environmental reasons, it is desirable to reduce or eliminate the use of sulfur in these compositions. Accordingly, the use of organic peroxides as curing agent is a desirable option. However, peroxide cured rubber compositions can suffer from less desirable physical properties than those of similar sulfur cured systems.

Therefore, there remains a need to produce improved liquid polyene based rubber compositions that result in reduced adverse environmental impacts, while optimizing the hardness and damping performance of these materials to seal or to reduce acoustic noise particularly for automotive and transportation applications.

Other workers' efforts to produce such materials are summarized as follows.

Japanese Patent Application Publication Nos. JP 2011 057776, and JP 2011 046795, British Patent No. GB 1 222 573, International Patent Application Publication No. WO 2018 106376, and Japanese Patent Nos. JP 5898977, JP 5445158, JP 5459189, and JP S5975932 disclose various rubber compounds, crosslinked with peroxide and also comprising coagents such as zinc (meth)acrylate salts, for "vibration-damping" or "vibration-proof" applications.

U.S. Pat. No. 9,493,687 B2 discloses sulfur crosslinked (cured) liquid rubber-based formulations applied as adhesive, sealant and damping materials inside a vehicle cabin to mitigate noise, vibration and harshness, also referred to as "NVH" materials.

The following non-patent documents disclose various crosslinking compositions for rubber compositions: S. K. Henning et al., Rubber World, p 28-35, February 2006; T. Okaya et al., NIPPON GOMU KYOKAISHI, Vol. 48, No. 11, p 705-715(1975); and P. R. Dluzneski, Rubber Chemistry and Technology, Vol. 74, No. 3, pp 451-492, July 2001.

SUMMARY OF THE INVENTION

Aspects of the invention are directed to curable low sulfur liquid rubber compositions and, in particular, to low sulfur liquid rubber compositions that are curable with a peroxide curing agent together with a coagent in a low coagent: peroxide ratio, as well as methods of manufacturing the same. The inventors have discovered that it is possible to obtain effective curing of compositions based on one or more liquid polyenes containing vinyl groups without the use of significant amounts of sulfur, if a peroxide system and a coagent are used together at a specified ratio, prior to curing, of coagent phr (by weight) to organic peroxide phr (by weight) of less than 3.0:1. In particular, after curing the compositions between 100° C. and 200° C. and for a cure time from about 5 minutes to about 10 hours to achieve the desired state of cure for the liquid rubber compositions, the cured composition has:

i. a loss factor (tan $\delta$) greater than 0.4 when measured at 50 Hz frequency, 3 µm amplitude, and temperatures between −30° C. and 45° C.; and ii. a swelling ratio from 40% to 170% by weight, as measured by equilibrium weight gain in toluene at 25° C.

In addition, the inventors have surprisingly discovered that by utilizing such relatively low ratios of coagent phr to organic peroxide phr, it is possible to achieve these desirable physical properties with a lower peroxide phr than compositions utilizing peroxide alone.

The invention disclosed herein is thus a heat curable low sulfur liquid rubber composition. The composition comprises a) at least one liquid polyene; b) at least one organic peroxide; c) at least one coagent other than sulfur or a sulfur compound, adapted for crosslinking; and d) 0% to less than 1% by weight of sulfur. The liquid polyene comprises as polymerized units, at least one comonomer having a carbon chain of at least four, a vinyl content of between 1 molar percent and 90 molar percent, and a number average molecular weight of from 800 g/mol to 70,000 g/mol. The ratio of coagent phr to organic peroxide phr (prior to curing) is less than 3.0:1.

After curing, the cured rubber composition has the properties as described above, namely: a loss factor (tan $\delta$) greater than 0.4 when measured at 50 Hz frequency, 3 µm amplitude, and temperatures between −80° C. and 80° C.; and a swelling ratio from 40% to 170% by weight, as measured by equilibrium weight gain in toluene at 25° C.

Also disclosed herein is a cured rubber composition. The cured rubber composition is a cured reaction product of the heat curable low sulfur liquid rubber composition. The heat curable liquid composition comprises, as described above: a) at least one liquid polyene; b) at least one organic peroxide; c) at least one coagent other than sulfur or a sulfur compound, adapted for crosslinking; and d) 0 to less than 1% by weight of sulfur. The liquid polyene in the heat curable composition comprises, as polymerized units, at least one comonomer having a carbon chain of at least four. The liquid polyene has a vinyl content of between 1 molar percent and 90 molar percent, and a number average molecular weight of 800 g/mol to 70,000 g/mol. The ratio of coagent phr to organic peroxide phr in the composition, prior to curing, is less than 3.0:1. After curing, the cured rubber composition has the following properties: i) a loss factor (tan $\delta$) greater than 0.4 when measured at 50 Hz frequency, 3 µm amplitude, and temperatures between −10° C. and 45° C.; and ii) a swelling ratio from 40% to 170% by weight, as measured by equilibrium weight gain in toluene at 25° C.

Disclosed and described herein is also a method of producing the cured low sulfur rubber composition. The method comprises the steps of:

A. Preparing a heat curable low sulfur liquid rubber composition by combining at least: a) at least one liquid polyene; b) at least one organic peroxide; c) at least one coagent other than sulfur or a sulfur compound, adapted for crosslinking; d) 0 to less than 1% by weight of sulfur. The liquid polyene comprises, as polymerized units, at least one comonomer having a carbon chain of at least four The liquid polyene also has a vinyl content of between 1 molar percent and 90 molar percent and a number average molecular weight of 800 g/mol to 70,000 g/mol. The ratio of coagent phr to organic peroxide phr, prior to curing, is less than 3.0:1.

B. Heating the heat curable low sulfur liquid rubber composition at a temperature between 100° C. and 190° C. for between 5 minutes and 10 hours to obtained a cured low sulfur rubber composition having the following properties: i.) a loss factor (tan δ) greater than 0.4 when measured at 50 Hz frequency, 3 μm amplitude, and temperatures between −30° C. and 45° C.; and ii.) a swelling ratio from 40% to 170% by weight, as measured by equilibrium weight gain in toluene at 25° C.

BRIEF DESCRIPTION OF THE DRAWING

The invention is best understood from the following detailed description when read in connection with the accompanying drawing.

The FIGURE is a plot of loss factor (tan δ at 50 Hz) as function of swelling ratio for various coagent to peroxide ratios at specified amounts of peroxide.

DETAILED DESCRIPTION OF THE INVENTION

The present invention is directed to low sulfur curable liquid rubber compositions, which comprise at least one liquid polyene rubber resin, at least one filler, at least one coagent and at least one organic peroxide in a specific range of the ratio of coagent phr to peroxide phr. The compositions are low sulfur, i.e., they comprise from 0 to 1% by weight of sulfur. The compositions are characterized by having a higher maximum tangent delta value at the same Shore A hardness than a similar formulation containing the same liquid rubber resin, at least one organic peroxide at a higher level and either no coagent or a higher ratio of coagent to peroxide. By incorporating a coagent at the specified relatively low coagent to peroxide ratios, while also reducing the peroxide level, it is possible to reduce significantly the peroxide content in adhesives, sealants and noise-vibration-harshness-mitigating "NVH" formulations, while achieving desirable cure rates, as well as achieving target crosslinking density, damping (as loss factor, tan δ) and hardness (as Shore A) properties of the cured composition. Typically, the peroxide content may be reduced by at least 30% compared to formulations with no coagent or with higher coagent phr to peroxide phr ratio. The curing temperatures may be in the range from 100° C. to 190° C.

Liquid Polyenes:

The polymer or the polymers comprising the liquid polyene has or have a polyene backbone, meaning that the backbone of the polymer chain comprises, in at least portions of the polymer backbone, multiple carbon-carbon double bonds.

All polymer molecular weights used herein are number average molecular weight (Mn).

The term, "liquid" as used herein means that prior to cure, the polyenes or blend of polyenes that comprise the liquid polyene component can be pumped or poured at a temperature below 100° C. without any additional additives. According to some embodiments, the polymer is liquid at 25° C.

The term "liquid polyene" as used herein means either a single liquid polyene or a blend of liquid polyenes. Therefore, properties of the liquid polyene refer to the single polyene, if only one polyene is used. If a blend of liquid polyenes is used, the properties refer to the blend as a whole. In addition, the polyene or polyenes can optionally be terminated with hydroxyl groups or functional derivatives thereof such as are known in the art. Non-limiting examples of such functional groups include, in addition to the —OH group: esters, carboxylic acids, epoxides, amides, amines, anhydrides, acrylates, methacrylates, and silanes.

According to one aspect of the invention, a curable low sulfur liquid rubber composition comprising at least one polyene and a peroxide is provided. The polyene comprises, as polymerized units, at least one monomer having a carbon chain of at least four. The polymer may comprise butadiene monomers, vinyl aromatic monomers, and/or other diene, triene or tetraene monomers, in polymerized form. For example, the polyene polymer may be a butadiene homopolymer (a polybutadiene) or may be a copolymer of butadiene and styrene monomers. The polymer may have a vinyl content of 1% to 90% or a vinyl content of, e.g., 5% to 85%, 10% to 80%, 15% to 75%, 20% to 70%, 25% to 65%, 30% to 60%, etc. In one embodiment, the polyene polymer comprises at least one of liquid polybutadiene and liquid styrene-butadiene copolymer, where the polyene polymer has at least 10% 1,2-vinyl content. The term "vinyl content" as used herein refers to a carbon-carbon double bond that is covalently bonded to the polyene backbone via a carbon-carbon single bond. Attached to the carbon-carbon double bond at the end farthest from the polyene backbone, there may be other alkyl or aryl groups. For instance, if farnesene is polymerized, the polyene molecule may, in part, have the structure below:

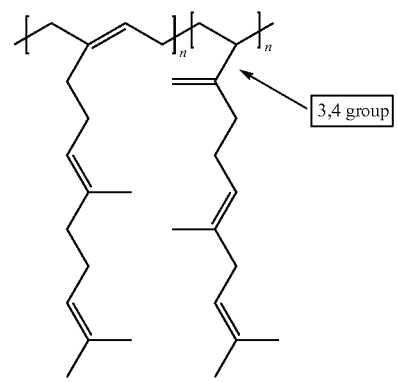

The double bonded carbons that are bolded in the above structure are considered to be part of the "vinyl content" of the polyene, as the term is used herein. Therefore, the term "vinyl content" as used herein corresponds to the molar percent of pendant groups having between 2 and 13 carbon atoms which are due to the reaction of the 1,2 C=C bond or the 3,4 C=C bond of diene, triene and/or tetraene monomers that are polymerized or copolymerized to form the polyene polymers.

The vinyl content can be measured by 1H Nuclear Magnetic Resonance (NMR) methods. These methods were used to determine the microstructure of liquid rubber resins as described herein in CDCl$_3$ (as a solvent) with a Bruker Advance III 400 MHz spectrometer. The analytical protocols described in the Iranian Polymer Journal 12 (6), 2003, p 515-521; and in Polymer Engineering and Science, 2007, p 87-94; and in the Conference Proceedings of the Fall 190th Technical Meeting of Rubber Division, ACS Cleveland, Ohio, Oct. 11-13, 2016. The methods described in U.S. Pat. No. 7,655,739 B1, which is incorporated by reference herein, may also be used to determine the vinyl content of the polyenes utilized in this invention.

Additionally, the polymer may have a number average molecular weight (as determined by gel permeation chromatography) of 800 g/mol to 70,000 g/mol. The number average molecular weight of the polymer may be from 800 g/mol to 50,000 g/mol, or from 800 g/mol to 20,000 g/mol, or from 800 g/mol to 15,000 g/mol, or from 800 g/mol to 10,000 g/mol, or from 1000 g/mol to 70,000 g/mol, or from 1000 g/mol to 50,000 g/mol, or from 1000 g/mol to 20,000 g/mol, or from 1000 g/mol to 15,000 g/mol, or from 1000 g/mol to 10,000 g/mol. Combinations of two or more different polymers having one or more of the above-mentioned characteristics may be utilized in the curable low sulfur liquid rubber composition.

Monomers:

Non-limiting examples of monomers that may be included as polymerized units in the liquid polyene polymer as described herein are: C4-C15 dienes, C6-C15 trienes, C8-C15 tetraenes, vinyl aromatic compounds, and mixtures thereof. Suitable non-limiting examples of C4 to C15 dienes that may (depending upon how they are polymerized) be used in the production of the polyenes are: butadiene; isoprene; 2,3-dimethyl butadiene; 2-phenyl butadiene; 1,3-pentadiene; 2-methyl-1,3-pentadiene; 1,3-hexadiene; 1,3-octadiene; 1,3-cyclohexadiene; 2-methyl-1,3-octadiene; bergamotene; limonene; and mixtures thereof. Non-limiting examples of C6 to C15 trienes are 1,3,7-octatriene; zingiberene; bisabolene; sesquiphellandrene; ocimene; myrcene; and mixtures thereof. Particular non-limiting examples of suitable vinyl aromatic-containing monomers that may be used in the practice of the invention are: styrene, alpha-methyl styrene, 2-methylstyrene, 3-methylstyrene, 4-methylstyrene, 4-propyl styrene, 4-t-butylstyrene, 4-cyclohexyl styrene, 2,4-dimethylstyrene, 2,4-diisopropyl styrene, 2,4,6-trimethyl styrene, 1-vinylnaphthalene, 2-vinyl naphthalene, N, N-diethyl-4-aminoethyl styrene, vinyl pyridine, 4-methoxystyrene, monochloro styrene, dichloro styrene, divinyl benzene, and mixtures thereof. A non-limiting example of a suitable C8-C15 tetraene is farnesene. Importantly, these monomers are incorporated in the liquid polyene or polyenes at levels that result in the recited amounts of vinyl groups in the liquid polyene, i.e. from 1% to 90% as detailed above.

Loss Factor (tan δ):

The loss factor, tan δ, is measured using dynamic mechanical analysis (DMA), usually over a temperature range. Tan δ is a measure of a material's ability to dissipate energy, and therefore a higher tan δ value is associated with a higher damping performance. The tan δ value changes depending on the temperature and so the temperature at which the maximum tan δ is measured is reported as the maximum loss factor temperature. The tan δ is measured at 50 Hz frequency, 3 μm amplitude, and over a range of temperatures from −80° C. to 80° C.

After cure (crosslinking) the heat curable liquid rubber composition disclosed herein may have a tan δ of 0.40 or higher. The maximum tan δ may be higher than 0.425, higher than 0.450, higher than 0.475, higher than 0.500, higher than 0.525, higher than 0.550, higher than 0.575, higher than 0.600, higher than 0.625, higher than 0.650, higher than 0.675, higher than 0.700, higher than 0.725, higher than 0.750, or higher than 0.775. After cure, the heat curable liquid rubber composition disclosed herein may have a maximum loss factor temperature greater than −10° C., greater than −5° C., greater than 0° C., greater than 5° C., greater than 10° C., greater than 15° C., greater than 20° C., greater than 25° C., greater than 30° C., greater than 35° C., or greater than 40° C.

Shore A Hardness:

Shore A devices may be employed to characterize the hardness of liquid rubbers-based formulations applied in the automotive industry, as adhesive, sealant and damping materials. Indeed, it is a standard and low cost protocol. For NVH, "noise, vibration and harshness" mitigating compositions cross-linked with sulfur applied inside a vehicle cabin, typical Shore A values are in the range from 70 to 85 (see, for instance, U.S. Pat. No. 9,493,687). However, Shore A values do not provide details on the crosslinking density of cured compositions. Therefore, it is not sufficient to compare the loss factor values of various compositions comprising liquid polyenes. The crosslinking density of formulations containing liquid polyenes having a Tg from −100° C. to +15° C. should be determined by a swelling test. Thus, it is desirable to compare the effect of various components in formulations all having similar Shore A hardness on the crosslinking rate of formulations as well as the effect on damping performance.

Shore A hardness as described herein is measured according to ASTM D2240-15. The cured heat curable liquid rubber polyene composition may have a Shore A hardness greater than 30, greater than 35, greater than 40, greater than 45, greater than 50, greater than 55, greater than 60, greater than 65, greater than 66, greater than 67, greater than 68, greater than 69, greater than 70, greater than 71, greater than 72, greater than 73, greater than 74, or greater than 75. The Shore A hardness of the cured heat curable liquid rubber polyene compositions as disclosed herein may be from 30 to 90, from 40 to 85, and alternatively from 50 to 80.

Swelling Ratio:

The swelling ratio is related to crosslink density of a cured rubber composition and is measured by determining how much solvent a crosslinked (cured) sample of the heat curable liquid rubber composition absorbs at a fixed temperature. In general, lower swelling ratios are associated with a greater crosslink density. As described herein, the crosslink density is reported as the equilibrium percent weight gain in toluene at 25° C. The swelling ratio of the crosslinked liquid rubber composition may be from 40% to 170% by weight, from 40% to 150% by weight, from 40% to 125% by weight, from 50% to 110% by weight, or from 60% to 100% by weight. The swelling ratio is measured according to the procedure described in the Examples.

Cure Conditions for Test Measurements of the Cured Compositions:

The properties of the cured rubber composition, i.e. tan δ, swelling ratio, and Shore A hardness, as disclosed herein are measured after the composition has been cured.

The curing temperature and time of the curable liquid rubber-based compositions is selected according to the application. The peroxides used for crosslinking are selected based on the curing temperature to be used and the 10-hour half-life temperature of the peroxide.

When the curing temperature is chosen, an Oscillating Disc Rheometer (ODR) is an equipment enabling to determine the vulcanization kinetics and to estimate the crosslinking densities of the curable liquid rubber compositions. Indeed, a rheometer measures the force generated by the deformation resistance of a specimen during its crosslinking reaction. This force is measured as torque (Unit: dNm). According to the measured torque values as a function of time, a rheometer curve can be defined. Based on this rheometer curve, the optimal curing time can be established (see the paragraph below related to curing kinetics of the curable liquid rubber-based compositions).

Organic Peroxides:

The terms "crosslink" and "cure" as used herein are interchangeable and are understood to mean that chemical bonds have been formed, directly or indirectly, between adjacent chains of the individual polyene molecules. The curable low sulfur liquid rubber compositions include at least one organic peroxide. By selecting certain ratios of organic peroxides or combinations of organic peroxides to coagent or blend of coagents, it was discovered that cured rubber compositions may be obtained with a reduced amount of sulfur content (e.g., a sulfur content of 1% or less) and reduced peroxide content, while advantageously having an increased crosslinking density and a desirably high damping ability as quantified by measuring tan δ, the loss factor at 50 Hz.

The amount of organic peroxide or blend of organic peroxides present in the curable low sulfur liquid rubber composition will vary depending upon the type(s) of organic peroxide used, the reactivities of the polyene polymer(s), the type and reactivity of the coagent(s), and the desired curing profile and target cured rubber properties as well as other factors. Typically, however, the curable low sulfur liquid polyene rubber composition will comprise an organic peroxide or blend of organic peroxides in an amount of 1 to 30 phr. As used herein, the term "phr" means parts by weight per 100 parts by weight resin, wherein the resin is the liquid polyene (e.g., liquid polybutadiene polymer) or combination of reactive (crosslinkable) liquid polyene polymers present in the curable low sulfur liquid polyene rubber composition. The peroxide(s) can be selected based on the desired curing temperature of the liquid rubber polyene composition. Typically, the curing temperature is between 100° C. and 190° C.

Organic peroxides may be used to cure the liquid polyene(s) of the present invention. Suitable organic peroxides include those organic peroxides commonly used in the art to crosslink polymers, including rubbers. Suitable organic peroxides include but are not limited to: dicumyl peroxide; aryl or diaryl peroxides; diacetyl peroxide; benzoyl peroxide; dibenzoyl peroxide; di-tert-butyl peroxide; tert-butyl-cumylperoxide; 2,5-bis (tert-butylperoxy)-2,5-dimethylhexane; cumyl peroxide; 2,5-dimethyl-2,5-di-(tert-butylperoxy) hexyne-3; p-bis[2-(2-t-butylperoxy)propyl] benzene; 2,5-dimethyl-2,5-di-tert-butylperoxyhexane; tert-butyl peroxide; tert-butylperbenzoate; tert-butylperoxyisopropylate, di-(2-ter-butylperoxy-isopropyl) benzene; butyl 4,4-di-(tert-butylperoxy) valerate; 1,1-di (tert-butylperoxy)-3,3,5-trimethylcyclohexane; and mixtures thereof.

Non-limiting examples of other suitable organic peroxides are: peroxyketals (such as 1,1'-di(tert-butylperoxy)-3, 3,5-trimethylcyclohexane or di(tert-butylperoxy)-cyclohexane); diacyl peroxides (such as dibenzoyl peroxide or dilauroyl peroxide) and peroxyesters (such as tert-butyl peroxyisobutyrate or tert-amyl peroxy-2-ethylhexylcarbonate). In another embodiment, the peroxide may be selected from the group consisting of peroxyketals (such as 1,1'-di (tert-butylperoxy)-3,3,5-trimethylcyclohexane or di(tert-butylperoxy)-cyclohexane); diacyl peroxides (such as dibenzoyl peroxide) and peroxyesters.

The curable liquid rubber composition may include, as heat-activated crosslinking agents, two or more organic peroxides. For example, the curable liquid rubber composition may comprise at least two peroxides selected from the group consisting of peroxyketals (such as 1,1'-di(tert-butylperoxy)-3,3,5-trimethylcyclohexane or di(tert-butylperoxy)-cyclohexane); diacyl peroxides (such as dibenzoyl peroxide or dilauroyl peroxide) and peroxyesters (such as tert-butyl peroxyisobutyrate or tert-amyl peroxy-2-ethylhexylcarbonate).

"Half-life" is a convenient means of expressing the rate of decomposition of an organic peroxide at a specified temperature. The time required for one-half of the organic peroxide originally present to decompose at any particular temperature is measured. Organic peroxides having a 10-hour half-life from 47° C. to 127° C. are suitable.

The amount of organic peroxide present in the curable liquid rubber composition will vary depending upon the type(s) of organic peroxide used, the reactivities of the polyene(s), the type(s) and reactivity of the coagent(s), the type and reactivity of the accelerator or activator (if present), and the desired curing profile and target cured rubber properties as well as other factors. Typically, however, the curable liquid rubber composition will comprise one or more organic peroxides in an amount of from 1 to 30 phr (parts per hundred parts, by weight, of the liquid polyene component), or from 1.5 to 20 phr, or from 1.5 phr to 19 phr, or from 1.5 phr to 18 phr, 1.5 phr to 15 phr, or from 1.5 phr to 10 phr, or from 1.0 phr to 9 phr, or from 2 phr to 8 phr, or from 3 phr to 7 phr of organic peroxide. It is to be understood that this amount refers to the organic peroxide or the total amount of organic peroxides if a blend is used. As used herein, the term "phr" means parts by weight per 100 parts by weight resin or liquid rubber, wherein the resin is the liquid polyene, i.e. the liquid polyene or combination of liquid polyenes in the curable liquid rubber composition.

Coagents:

As used herein, the term "coagent" refers to non-peroxide, non-sulfur compounds that are also capable of crosslinking the liquid polyenes. The curable liquid rubber compositions may include at least one coagent that is adapted for crosslinking with organic peroxides. Typically, at least some portion of the coagent becomes covalently bonded into the polymeric network formed upon crosslinking the liquid polyene(s). For example, residues derived from the coagent may bridge between individual molecules of liquid polyene. The coagent may contain one or more sites of ethylenic unsaturation (carbon-carbon double bonds) per molecule and may be selected from the group consisting of acrylates, methacrylates, metal acrylates, metal methacrylates, bismaleimides, vinyl esters, allylic compounds, and derivatives thereof. In preferred embodiments of the invention, the curable liquid polyene composition is comprised of from 0.1 phr to 30 phr coagent in total. In other embodiments, the curable liquid rubber composition may be comprised of 0.5 phr to 15 phr by weight coagent. The curable liquid rubber composition may comprise from 1.5 to 20 phr, or from 1.5 phr to 19 phr, or from 1.5 phr to 18 phr, 1.5 phr to 15 phr, or from 1.5 phr to 10 phr, or from 3 phr to 10 phr of coagent, or from 5 phr to 10 phr, or from 1 phr to 8 phr or from 1 phr to 7 phr, or from 1 phr to 6 phr. As used herein, the term "phr" means parts by weight per 100 parts by weight resin, wherein the resin is the liquid polyene, i.e. the liquid polyene or combination of liquid polyenes in the curable liquid rubber composition.

Non-limiting examples of suitable coagents include metallic acrylates, metallic methacrylates, metallic acrylate salts, metallic methacrylate salts, zinc diacrylate (ZDA); zinc dimethacrylate (ZDMA); calcium diacrylate; calcium dimethacrylate; magnesium diacrylate; magnesium dimethacrylate; trimethylolpropane triacrylate (TMPTA); trimethylolpropane trimethacrylate (TMPTMA); ethylene glycol dimethacrylate (EGDMA); ethylene glycol diacrylate (EGDA); N, N'-m-phenylene dimaleimide (PDM); triallyl cyanurate; triallyl isocyanurate; diallyl phthalate; and mixtures thereof. Zinc acrylate, zinc methacrylate, zinc acrylate salts, and zinc methacrylate salts may be mentioned in particular.

Ratio of Coagent Phr to Peroxide Phr:

The inventors have surprisingly discovered that relatively low ratios of coagent phr to organic peroxide phr results in cured compositions that have higher damping (as measured by tan $\delta$) and crosslinking density (as measured by swelling ratio) than compositions cured with either higher coagent phr to peroxide phr ratios or no coagent (i.e. all peroxide) to achieve the same Shore A hardness. In particular the coagent phr to organic peroxide ratio is less than 3.0 to 1.0, or less than 2.9 to 1.0, or less than 2.8 to 1.0, or less than 2.7 to 1.0, or less than 2.6 to 1.0, or less than 2.5 to 1.0, or less than 2.4 to 1.0, or less than 2.3 to 1.0, or less than 2.2 to 1.0, or less than 2.1 to 1.0, or less than 2.0 to 1.0, or less than 1.9 to 1.0, or less than 1.8 to 1.0, or than 1.7 to 1.0, or less than 1.6 to 1.0, or less than 1.5 to 1.0, or less than 1.4 to 1.0, or less than 1.3 to 1.0, or less than 1.2 to 1.0, or less than 1.1 to 1.0, or less than 1.0 to 1.0, 0.9 to 1.0, or less than 0.8 to 1.0, or less than 0.7 to 1.0, or less than 0.6 to 1.0, or less than 0.5 to 1.0, or less than 0.4 to 1.0, or less than 0.3 to 1.0, or less than 0.2 to 1.0, or less than 0.1 to 1.0.

Total Amount of Peroxide Phr and Coagent Phr:

The total amount of organic peroxide and coagent (as phr) can be from 1.5 phr to 40 phr, or from 1.5 phr to 30 phr, or from 1.5 phr to 20 phr, or from 2 phr to 16 phr, or from 2 phr to 16 phr, or from 5 phr to 16 phr. As used herein, the term "phr" means parts by weight per 100 parts by weight resin or liquid rubber, wherein the resin is the liquid polyene, i.e. the liquid polyene or combination of liquid polyenes in the curable liquid rubber composition.

Sulfur Content:

Advantageously, the curable low sulfur liquid rubber compositions have a sulfur content of 0 to 1%, by weight. Alternatively, the sulfur content of the low sulfur liquid rubber composition is 0% to 0.9% by weight, alternatively 0 to 0.75% by weight, alternatively 0 to 0.6% by weight, or alternatively 0 to 0.5% by weight.

Methods of Making the Curable Low Sulfur Liquid Rubber Composition:

According to another aspect of the invention, a method is provided for making a curable low sulfur liquid rubber composition. The method may include polymerizing at least one monomer having a carbon chain of four to produce a polyene polymer having a vinyl content of 1% to 90% and a number average molecular weight of 800 g/mol to 15,000 g/mol. Alternatively, a suitable polyene polymer may be obtained commercially from companies such as TOTAL Cray Valley.

According to a further aspect of the invention, a cured low sulfur rubber is provided. The cured low sulfur rubber may be obtained by curing a curable low sulfur liquid rubber composition as disclosed herein by heating the curable low sulfur liquid rubber composition. The curable low sulfur liquid rubber composition is, advantageously, curable at a temperature of 100° C. to 190° C. and has a sulfur content of 0 to 1% by weight. As a result of such curing, the curable low sulfur liquid rubber composition is converted (e.g., by crosslinking reactions) into a solid, elastomeric (rubbery) composition. Typically, curing is achieved by heating the curable low sulfur liquid rubber composition to a temperature effective to initiate the desired crosslinking reaction involving at least the polymer component. Typically the time period to achieve adequate cure is between 5 minutes and 10 hours.

Other Additives:

Optionally, one or more additional components may be included in the curable low sulfur liquid rubber composition in order to achieve the final properties desired for particular end-use applications (such as adhesive and sealant applications). A non-exhaustive list of such optional additional components is as follows:

one or more solid rubbers or solid elastomers or solid thermoplastics;

fillers, alternatively fillers heat treated or treated with silanes, resins, or cationic species to prevent/reduce decomposition of some peroxides;

tackifiers and/or coupling agents;

accelerators and/or activators, such as metal oxides (e.g., zinc oxide), fatty acid metal salts (e.g., metal stearates), fatty acids (e.g., stearic acid), and mixtures thereof.

adhesion promoters, such as functionalized liquid rubber resins (e.g., maleinized liquid polybutadiene resins);

plasticizers or extender oils, such as paraffinic oil; and/or stabilizers against thermal, thermo-oxidative and/or ozone degradation.

According to certain embodiments of the invention, the curable low sulfur liquid rubber composition includes at least one filler, in particular at least one inorganic filler. Suitable fillers include any of the fillers known in the art related to curable liquid rubber compositions, including for example calcium carbonate, silicas, carbon black, clays, talc, mica, calcium oxide, aluminas, magnesium carbonate, and the like. The aforementioned fillers may be heat treated or treated with silanes, resins, or cationic species to prevent or reduce decomposition of some peroxides. The curable low sulfur liquid rubber composition may, for example, be comprised of up to 75 phr filler.

Exemplary Uses:

The curable low sulfur liquid rubber compositions of the present invention are especially useful for the production of materials intended for the reduction of vibration and/or acoustic noise, such as in automotive and other vehicular applications. The curable low sulfur liquid rubber compositions in the cured state have acoustic damping properties. Any of the known or conventional coating, molding, shaping, forming or impregnation methods known in the art may be employed to produce articles comprised of a cured rubber obtained from the curable low sulfur liquid rubber compositions of the present invention. For example, the inventive curable low sulfur liquid rubber compositions may be utilized in the manufacture of acoustic dampening components (such as sheets, blocks, etc.), belts, hoses, rubber rollers, engineered products, vibration mounts, tires, O rings, gaskets, wire and cable coatings, expansion joints, and the like, including elastomeric products or composite products containing an elastomeric component generally. The use of the curable low sulfur liquid rubber compositions of the present invention as adhesives, sealants and coatings is also contemplated. In one embodiment, the curable low sulfur liquid rubber composition is applied to a substrate surface (such as a metal sheet, panel or other such component), using a suitable technique such as spraying, dipping, roller coating, extrusion or the like, and then heated to a temperature effective to cure the curable low sulfur liquid rubber composition. Accordingly, the curable low sulfur liquid rubber composition may be formulated such that it has a viscosity which makes it capable of being applied by spraying. For example, the curable low sulfur liquid rubber composition may be pumpable or sprayable with the aid of automatic application systems, such as robotic systems.

Curing Conditions:

Typically, curing is achieved by heating the curable liquid rubber composition to a temperature effective to initiate the desired crosslinking reaction. The curing temperature will depend upon the organic peroxide and coagent employed, as well as the reactivity of the other components of the curable liquid rubber composition, but generally speaking temperatures within the range of from about 100° C. to about 240° C. are suitable (with temperatures of from about 100° C. to about 190° C. being typically preferred). After the desired temperature is reached, the heating may be carried out for a time effective to achieve the desired state of cure. Such cure times are variable, depending upon a number of factors, but typically are from about 5 minutes to about 10 hours.

Various exemplary aspects of the invention may be summarized as follows:

Aspect 1: A heat curable low sulfur liquid rubber composition, the composition comprising:
 a) at least one liquid polyene comprising, as polymerized units, at least one comonomer having a carbon chain of at least four, the at least one liquid polyene having a vinyl content of between 1 molar percent and 90 molar percent and a number average molecular weight of 800 g/mol to 70,000 g/mol;
 b) at least one organic peroxide;
 c) at least one coagent other than sulfur or a sulfur compound, adapted for crosslinking;
 d) less than 1% by weight of sulfur;
 wherein the ratio of coagent phr to organic peroxide phr is less than 3.0:1;
 and wherein, after curing, the cured rubber composition has:
 i. a loss factor (tan δ) greater than 0.4 when measured at 50 Hz frequency, 3 μm amplitude, and temperatures between −80° C. and 80° C.; and
 ii. a swelling ratio from 40% to 170% by weight, as measured by equilibrium weight gain in toluene at 25° C.

Aspect 2: The heat curable low sulfur liquid rubber composition according to Aspect 1, comprising 0% by weight of sulfur.

Aspect 3: The heat curable low sulfur liquid rubber composition according to any of Aspects 1 and 2, wherein the at least one coagent comprises a metal-centered monomer.

Aspect 4: The heat curable low sulfur liquid rubber composition according to any of Aspects 1-3, wherein the at least one coagent is present at less than 10 parts per hundred parts by weight polyene (phr).

Aspect 5: The heat curable liquid rubber composition according to to any of Aspects 1-4, wherein the ratio of coagent phr to organic peroxide phr is less than 2.50:1.

Aspect 6: The heat curable liquid rubber composition according to to any of Aspects 1-5, wherein the ratio of coagent phr to organic peroxide phr is less than 1.80:1.

Aspect 7: The heat curable low sulfur liquid rubber composition according to to any of Aspects 1-6, wherein the ratio of coagent phr to organic peroxide phr is less than 1.50:1.

Aspect 8: The heat curable low sulfur liquid rubber composition according to Aspect to any of Aspects 1-7, wherein the ratio of coagent phr to organic peroxide phr is less than 1.05:1.

Aspect 9: The heat curable low sulfur liquid rubber composition according to Aspect to any of Aspects 1-8, wherein the at least one organic peroxide is present at less than 20 parts per hundred parts by weight polyene (phr).

Aspect 10: The heat curable low sulfur liquid rubber composition according to any of Aspects 1-9, wherein the at least one coagent and the at least one organic peroxide together are present in the composition between 1.5 and 35 phr.

Aspect 11: The heat curable low sulfur liquid rubber composition according to any of Aspects 1-10, wherein the at least one coagent and the at least one organic peroxide together are present in the composition between 1.5 and 20 phr and the ratio of coagent phr to peroxide phr is less than 1.8:1.

Aspect 12: The heat curable low sulfur liquid rubber composition according to any of Aspects 1-11, wherein the at least one liquid polyene has a vinyl content of at least 40 molar percent.

Aspect 13: The heat curable low sulfur rubber composition according to any of Aspects 1-12, wherein the at least one liquid polyene has a number average molecular weight between 800 g/mol and 50,000 g/mol.

Aspect 14: The heat curable low sulfur rubber composition according to any of Aspects 1-13, wherein the composition is curable in a temperature range between 100° C. to 190° C.

Aspect 15: The heat curable low sulfur liquid rubber composition according to any of Aspects 1-14, wherein the at least one coagent comprises at least one coagent selected from the group consisting of zinc diacrylate (ZDA); zinc dimethacrylate (ZDMA); calcium diacrylate; calcium dimethacrylate; magnesium diacrylate; magnesium dimethacrylate; trimethylolpropane triacrylate (TMPTA); trimethylolpropane trimethacrylate (TMPTMA); ethylene glycol dimethacrylate (EGDMA); ethylene glycol diacrylate (EGDA); N, N'-m-phenylene dimaleimide (PDM); triallyl cyanurate; triallyl iscyanurate; diallyl phthalate; and mixtures thereof.

Aspect 16: The heat curable low sulfur liquid rubber composition according to any of Aspects 1-15, wherein the at least one metal-centered monomer comprises at least one metal-centered monomer selected from the group consisting of zinc diacrylate (ZDA), zinc dimethacrylate (ZDMA), calcium diacrylate, calcium dimethacrylate, magnesium diacrylate, magnesium dimethacrylate, and mixtures thereof.

Aspect 17: The heat curable low sulfur liquid rubber composition according to any of Aspects 1-16, wherein the at least one organic peroxide comprises at least one organic peroxide selected from the group consisting of peroxyketals, diacyl peroxides, peroxyesters, dialkyl peroxides, and mixture thereof.

Aspect 18: The heat curable low sulfur liquid rubber composition according to any of Aspects 1-17, wherein the at least one coagent comprises a monomer having at least two ethylenically unsaturated functional groups per molecule.

Aspect 19: The heat curable low sulfur liquid rubber composition according to any of Aspects 1-18, wherein the liquid polyene comprises, in polymerized form, at least one monomer selected from the group consisting of trienes, tetraenes, dienes, vinyl aromatic compounds, and mixtures thereof.

Aspect 20: The heat curable low sulfur liquid rubber composition according to any of Aspects 1-19, comprising between 10 and 80 weight percent of the at least one liquid polyene.

Aspect 21: A cured rubber composition which is a cured reaction product of a heat curable low sulfur liquid rubber composition comprising:
  a) at least one liquid polyene comprising, as polymerized units, at least one comonomer having a carbon chain of at least four, the at least one polyene having a vinyl content of between 1 molar percent and 90 molar percent and a number average molecular weight of 800 g/mol to 70,000 g/mol;
  b) at least one organic peroxide;
  c) at least one coagent other than sulfur or a sulfur compound, adapted for crosslinking;
  d) 0 to less than 1% by weight of sulfur;
  wherein the ratio of coagent phr to organic peroxide phr is less than 3.0:1;
  and wherein, after curing, the cured rubber composition has:
    i. a loss factor (tan δ) greater than 0.4 when measured at 50 Hz frequency, 3 μm amplitude, and temperatures between −10° C. and 45° C.; and
    ii. a swelling ratio from 40% to 170% by weight, as measured by equilibrium weight gain in toluene at 25° C.

Aspect 22. A method of producing a cured low sulfur rubber composition, the method comprising the steps of:
  A. preparing a heat curable low sulfur liquid rubber composition by combining at least:
    a) at least one liquid polyene comprising, as polymerized units, at least one comonomer having a carbon chain of at least four, the at least one liquid polyene having a vinyl content of between 1 molar percent and 90 molar percent and a number average molecular weight of 800 g/mol to 70,000 g/mol;
    b) at least one organic peroxide;
    c) at least one coagent other than sulfur or a sulfur compound, adapted for crosslinking;
    d) 0 to less than 1% by weight of sulfur;
    wherein the ratio of coagent phr to organic peroxide phr is less than 3.0:1; and
  B. heating the heat curable low sulfur liquid rubber composition at a temperature between 100° C. and 190° C. for between 5 minutes and 10 hours;
    to obtain a cured low sulfur rubber composition having:
    i. a loss factor (tan δ) greater than 0.4 when measured at 50 Hz frequency, 3 μm amplitude, and temperatures between −30° C. and 45° C.; and
    ii. a swelling ratio from 40% to 170% by weight, as measured by equilibrium weight gain in toluene at 25° C.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable low sulfur liquid rubber composition, process using the curable low sulfur liquid rubber composition, or article made using the curable low sulfur liquid rubber composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The following non-limiting examples are provided for the purpose of elucidating the advantages obtained from aspects of the present invention. Some experiments have been performed to prove that the maximum tangent delta can be increased by incorporating a coagent and reducing the content of organic peroxide(s). The liquid rubber resins utilized for the examples is a liquid polybutadiene with 60% of vinyl content and a number average molecular weight (Mn) in the range of 1250 g/mol to 1500 g/mol.

Preparation of Curable Liquid Polyene Rubber-Based Compositions

The curable liquid rubber-based compositions are prepared with a Speed Mixer (able to mix the components at least 3000 rpm) at room temperature. The protocol is the following:
  Step 1: Add the liquid polyene(s), peroxide(s) coagent (if used), metal oxide, fatty acid, and other additives, except for filler in the formulation; then mix at 3000 rpm for 60 seconds.
  Step 2: Add half of the filler amount in the composition; then mix at 3000 rpm for 60 more seconds.
  Step 3: Add the rest of the filler amount in the composition; then mix at 3000 rpm for an additional 60 seconds.
  Step 4: Visually inspect the mixture (to check the homogeneity) before launching the last mixing step at 3000 rpm for 180 seconds.

After all mixing steps were completed, the compositions were cured in the temperature range from 100° C. to 190° C. The curing time depended on the amount and type of organic peroxide(s) and coagent. The curing step occurs in a mold to obtain a sheet having the following size: 75 mm×75 mm×3.7 mm.

Curing Kinetics of Curable Liquid Rubber-Based Composition

To determine the crosslinking kinetics of formulations at 140° C. or at 160° C., an oscillating rheometer (ODR) was used to measure torque during cure of the compositions. These isothermal tests were carried out at 140° C. and at 160° C. The results were reported as $T_{s1}$(min) and $T_{90}$(min). $T_{s1}$(min) is related to the scorch time at the tested temperature and $T_{90}$(min) is related to the optimum cure time at the tested temperature.

The following experiments used an RPA 2000 ODR apparatus from Alpha Technologies.

To perform curing kinetics test, the following test parameters were used:
  Temperature setpoint: Set according to the desired curing temperature.
  Time setpoint: Set according to the application.
  Frequency setpoint: 1.667 Hz.
  Angle setpoint: 6.97%.

The curing kinetics are reported as $T_{s1}$(min) and $T_{90}$(min). $T_{s1}$(min) refers to the time from the minimum torque in dNm, $M_L$, to achieve a torque equal to ($M_L$+1 dNm) at the specified temperature and angle setpoint. $T_{90}$(min) refers to the time for the torque to increase 90 times the difference in units of dNm between the maximum torque, $M_H$, and the minimum torque, $M_L$, more than the minimum torque, $M_L$. Therefore, the reported values are:

$$T_{s1}(\text{min}) = (M_L + 1 \text{ dNm}) \text{ in minutes}$$

$$T_{90}(\text{min}) = M_L + 90(M_H - M_L) \text{ in minutes}$$

$T_{s1}$(min) is related to the scorch time at the tested temperature and $T_{90}$(min) is related to the optimum cure time at the tested temperature.

Swelling Test

From cured sheet, two specimens sized 25 mm×7 mm×3.7 mm were cut and weighed (Initial Weight). The initial weight of each sample was approximatively 0.7 g to 1.0 g. Each sample was completely immersed in pure toluene, in a sealed glass bottle, at room temperature (25° C.) until equilibrium swelling occurred. The swelling test takes approximately 24 hours. When this step was completed, the swelled samples were removed from the bottles. The surface of each sample was wiped of excess toluene and the weight of swollen sample (Swelled Weight) was immediately measured.

From the initial weight of samples and their weight at the end of swelling test, the swelling ratio (Swelling Ratio) can be calculated:

Swelling Ratio (%)=100×[(Swelled Weight)−(Initial Weight)]/(Initial Weight)

Shore A Hardness

A Shore A hardness device was used to measure the hardness of the cured sheet of each composition. The sheet thickness was 3.7 mm at room temperature (23° C.±2° C.). The Shore A hardness was recorded after a measuring period of at least 20 seconds. The Shore A hardness was measured according to ASTM D2240-15.

Maximum Loss Factor and Maximum Loss Factor Temperature

For determining the maximum loss factor and the temperature of maximum loss factor, the compositions were tested in a Q800 DMA (Dynamic Mechanical Analyzer) apparatus (from TA Instruments) operated with the Shear Sandwich clamp. Specimens having a size 10 mm×10 mm×3.7 mm were cut from the cured sheet of each composition and were analyzed with the DMA equipment according to the following conditions:

Amplitude: 3 μm
Frequency: 50 Hz
Temperature range: from −80° C. to +80° C.

Maximum loss factor at 50 Hz corresponds to the maximum tan δ value observed on the tan δ curve of the composition, registered during its DMA analysis.

Cure Kinetics:

The cure rate of each formulation was measured with an oscillating disc rheometer (ODR) as described above. To determine the crosslinking kinetics of formulations at 140° C. or at 160° C., an oscillating rheometer (ODR) is used to measure torque during cure of the compositions. These isothermal tests were carried out at 140° C. and at 160° C. The results were reported as $T_{s1}$(min) and $T_{90}$(min). $T_{s1}$(min) is related to the scorch time at the tested temperature and T90(min) is related to the optimum cure time at the tested temperature.

The curing kinetics are reported as $T_{s1}$(min) and $T_{90}$(min). $T_{s1}$(min) refers to the time from the minimum torque in dNm, $M_L$, to achieve a torque equal to ($M_L$+1 dNm) at the specified temperature and angle setpoint. $T_{90}$(min) refers to the time for the torque to increase from the minimum torque, $M_L$, to 90/100 of the difference in units of dNm between the maximum torque, $M_H$, and the minimum torque, $M_L$. Therefore, the reported values are:

$T_{s1}$(min)=time to reach [($M_L$+1 dNm)]; in minutes $T_{90}$(min)=time to reach [$M_L$+90($M_H$−$M_L$)/100 dNm]; in minutes $T_{s1}$(min) is related to the scorch time at the tested temperature and $T_{90}$(min) is related to the optimum cure time at the tested temperature.

Table 1 below, shows the Examples and Comparative Examples that were prepared according to the above procedures, as well as the test results obtained from each formulation sample.

TABLE 1

| Results from formulations having Shore A values from 70 to 78 | | | | | | | | |
|---|---|---|---|---|---|---|---|---|
| Component | Comparative Examples | | | | Examples (Invention) | | | |
| (phr) | 1 | 2 | 3 | 4 | 1 | 2 | 3 | 4 |
| LPB with 60% vinyl groups | 100.0 | 100.0 | 100.0 | 100.0 | 100.0 | 100.0 | 100.0 | 100.0 |
| OMYALITE® 90 OM | 59.1 | 59.1 | 59.1 | 59.1 | 59.1 | 59.1 | 59.1 | 59.1 |
| ZnO | 5.6 | 5.6 | 5.6 | 5.6 | 5.6 | 5.6 | 5.6 | 5.6 |
| Stearic acid | 0.9 | 0.9 | 0.9 | 0.9 | 0.9 | 0.9 | 0.9 | 0.9 |
| LOPEROX® 231XL40* | 18.0 | 15.8 | 15.0 | 4.9 | 7.2 | 9.9 | 9.9 | 9.3 |
| LUPEROX® 331M50† | 14.1 | 12.7 | 12.0 | 4.0 | 5.8 | 8.0 | 8.0 | 7.4 |
| Dymalink® 633‡ | | | | 15.0 | 9.9 | 6.6 | | 5.4 |
| TMPTA** | | | | | | | 6.6 | |
| Total formulation | 197.7 | 194.1 | 192.6 | 189.5 | 188.5 | 190.1 | 190.1 | 187.7 |
| Active Peroxide phr | 14.3 | 12.7 | 12.0 | 4.0 | 5.8 | 8.0 | 8.0 | 7.5 |
| Coagent to Peroxide Ratio (phr) | 0.00:1 | 0.00:1 | 0.00:1 | 3.79:1 | 1.71:1 | 0.83:1 | 0.83:1 | 0.72:1 |

TABLE 1-continued

Results from formulations having Shore A values from 70 to 78

| Component | Comparative Examples | | | | Examples (Invention) | | | |
|---|---|---|---|---|---|---|---|---|
| (phr) | 1 | 2 | 3 | 4 | 1 | 2 | 3 | 4 |
| Data from Oscillating Rheometer During Cure of Formulations | | | | | | | | |
| Curing Temperature | 140° C. | 140° C. | 140° C. | 140° C. | 140° C. | 140° C. | 140° C. | 140° C. |
| ts1 (min) | 3.4 | 4.6 | 5 | 1.5 | 2.5 | 3.0 | 2.5 | 4.1 |
| T'90 | 26.5 | 28.0 | 29.2 | 25.7 | 27.5 | 30.0 | 29.0 | 30.0 |
| Characteristics of Cured Liquid Polyene-Based Compositions | | | | | | | | |
| Swelling test-Toluene | +44% | +54% | +74% | +30% | +45% | +46% | +45% | +59% |
| SHORE A | 78 | 75 | 70 | 80 | 73 | 75 | 76 | 69 |
| Temperature (Tan δ max) | 24 | 10 | 5 | −4 | −7 | −3 | 4 | −9 |
| Tan δ Max | 0.322 | 0.435 | 0.528 | 0.254 | 0.446 | 0.477 | 0.428 | 0.597 |

*40% active 1,1-bis(tert-butylperoxy)-3,3,5-trimethylcyclohexane peroxide
†50% active 1,1-bis(tert-butylperoxy)cyclohexane peroxide
‡Zinc diacrylate
**trimethylolpropane triacrylate This table highlights the following results. If the coagent amount incorporated in the formulation is higher than 10 phr, the damping properties are not improved and the hardness of composition was difficult to control. The formulation Comparative 4 (comprising 15 phr coagent) has a low tan δ and a similar hardness to the three compositions comprising less than 10 phr coagent and having a swelling ratio of about 45% (Examples 1, 2, and 3). The latter are also characterized by similar or higher max tan δ values than the formulations containing only organic peroxides (i.e. NO coagent) (Comparative Examples 1, 2 and 3), while having a lower swelling ratio. The exact coagent used, the amount of coagent incorporated in the formulation and the coagent to peroxide ratio all have an effect on the damping properties of liquid rubber-based compositions, when the cured Shore A hardness values are similar. By comparing the properties of Comparative 3 composition with those of Example 4 composition, the composition containing peroxides and Dymalink® 633 (i.e. coagent) possesses approximately 12% higher max tangent delta value and crosslinking density than the Comparative Example 3, which both have similar Shore A hardness. These results also demonstrate that a high coagent to peroxide ratio (Comparative Example 4, ratio is 3.79:1) results in a lower damping performance, as shown by the reduced tan δ.

To enhance the maximum tangent delta value of liquid polybutadiene-based compositions cured with organic peroxides, the coagent amount may be less than 10 phr and the coagent phr to peroxide phr ratio may be less than 1.75. If the coagent phr to peroxide phr ratio is less than 1.05, the maximum tan δ value may increased at by approximately 15%, at the same swelling ratio, while incorporating significantly less peroxide content introduced in the formulation. These results demonstrate an approximately 30% reduction in peroxide use if the coagent to peroxide ratio is sufficiently low.

Moreover, the kinetics of the crosslinking of the formulations are not significantly impacted when the organic peroxide content is significantly decreased. By decreasing significantly the peroxide contents (as demonstrated previously), it can be assumed that the volatile organic compounds emission due to the peroxide decomposition released by liquid rubber-based compositions during cure should be reduced. If the Tg of compositions needs to be adjusted, plasticizers or thermoplastic resins characterized by a high Tg can be incorporated in the liquid rubber-based formulations.

Other formulations containing a liquid polybutadiene with 60% vinyl content were prepared and cured with specific amounts of organic peroxide blends at 140° C. and 160° C. in order to demonstrate the effect of the amount of coagent and coagent to peroxide ratio on the damping properties (tan δ) and the swelling ratio for samples having similar cured Shore A values. The results are shown in the FIGURE, which is a plot of loss factor (tan δ) at different swelling ratios. As can be seen in the FIGURE, for samples where either no coagent was used or more than 15 phr of coagent was used (lower line), at the same swelling ratio, the damping properties were much lower than samples having the same swelling ratio, but prepared with less than 10 phr coagent and a similar amount of peroxide. Put another way, it is possible to conclude that the incorporation of the proper amount of coagent in a liquid polyene rubber-based composition cured with organic peroxides enables significant improvement in the balance of crosslinking density and damping properties of these formulations. Surprisingly, the quantity of coagent introduced into the formulation may be less than 10 phr and the coagent (phr) to peroxide (phr) ratio may be less than 1.75, and alternatively less than 1.5 to achieve these desirable results. This improvement is observed over a large swelling ratio range.

What is claimed is:

1. A heat curable low sulfur liquid rubber composition, the composition comprising:
   a) at least one liquid polyene comprising, as polymerized units, at least one comonomer having a carbon chain of at least four, the at least one liquid polyene having a vinyl content of between 1 molar percent and 90 molar percent and a number average molecular weight of 800 g/mol to 70,000 g/mol;
   b) at least one organic peroxide;
   c) at least one coagent other than sulfur or a sulfur compound, adapted for crosslinking;
   d) less than 1% by weight of sulfur;
      wherein the ratio of coagent phr to organic peroxide phr is less than 3.0:1;

and wherein, after curing, the cured rubber composition has:
  i. a loss factor (tan δ) greater than 0.4 when measured at 50 Hz frequency, 3 μm amplitude, and temperatures between −80° C. and 80° C.; and
  ii. a swelling ratio from 40% to 170% by weight, as measured by equilibrium weight gain in toluene at 25° C.

2. The heat curable low sulfur liquid rubber composition according to claim 1, comprising 0% by weight of sulfur.

3. The heat curable low sulfur liquid rubber composition according to claim 1, wherein the at least one coagent comprises a metal-centered monomer.

4. The heat curable low sulfur liquid rubber composition according to claim 1, wherein the at least one coagent is present at less than 10 parts per hundred parts by weight polyene (phr).

5. The heat curable liquid rubber composition according to claim 1 wherein the ratio of coagent phr to organic peroxide phr is less than 2.50:1.

6. The heat curable liquid rubber composition according to claim 1 wherein the ratio of coagent phr to organic peroxide phr is less than 1.80:1.

7. The heat curable low sulfur liquid rubber composition according to claim 1 wherein the ratio of coagent phr to organic peroxide phr is less than 1.50:1.

8. The heat curable low sulfur liquid rubber composition according to claim 1 wherein the ratio of coagent phr to organic peroxide phr is less than 1.05:1.

9. The heat curable low sulfur liquid rubber composition according to claim 1, wherein the at least one organic peroxide is present at less than 20 parts per hundred parts by weight polyene (phr).

10. The heat curable low sulfur liquid rubber composition according to claim 1 wherein the at least one coagent and the at least one organic peroxide together are present in the composition between 1.5 and 35 phr.

11. The heat curable low sulfur liquid rubber composition according to claim 1 wherein the at least one coagent and the at least one organic peroxide together are present in the composition between 1.5 and 20 phr and the ratio of coagent phr to peroxide phr is less than 1.8:1.

12. The heat curable low sulfur liquid rubber composition according to claim 1, wherein the at least one liquid polyene has a vinyl content of at least 40 molar percent.

13. The heat curable low sulfur rubber composition according to claim 1, wherein the at least one liquid polyene has a number average molecular weight between 800 g/mol and 50,000 g/mol.

14. The heat curable low sulfur rubber composition according to claim 1, wherein the composition is curable in a temperature range between 100° C. to 190° C.

15. The heat curable low sulfur liquid rubber composition according to claim 1 wherein the at least one coagent comprises at least one coagent selected from the group consisting of zinc diacrylate (ZDA); zinc dimethacrylate (ZDMA); calcium diacrylate; calcium dimethacrylate; magnesium diacrylate; magnesium dimethacrylate; trimethylolpropane triacrylate (TMPTA); trimethylolpropane trimethacrylate (TMPTMA); ethylene glycol dimethacrylate (EGDMA); ethylene glycol diacrylate (EGDA); N, N'-m-phenylene dimaleimide (PDM); triallyl cyanurate; triallyl isocyanurate; diallyl phthalate; and mixtures thereof.

16. The heat curable low sulfur liquid rubber composition according to claim 3 wherein the at least one metal-centered monomer comprises at least one metal-centered monomer selected from the group consisting of zinc diacrylate (ZDA), zinc dimethacrylate (ZDMA), calcium diacrylate, calcium dimethacrylate, magnesium diacrylate, magnesium dimethacrylate, and mixtures thereof.

17. The heat curable low sulfur liquid rubber composition according to claim 1, wherein the at least one organic peroxide comprises at least one organic peroxide selected from the group consisting of peroxyketals, diacyl peroxides, peroxyesters, dialkyl peroxides, and mixture thereof.

18. The heat curable low sulfur liquid rubber composition according to claim 1, wherein the at least one coagent comprises a monomer having at least two ethylenically unsaturated functional groups per molecule.

19. The heat curable low sulfur liquid rubber composition according to claim 1 wherein the liquid polyene comprises, in polymerized form, at least one monomer selected from the group consisting of trienes, tetraenes, dienes, vinyl aromatic compounds, and mixtures thereof.

20. The heat curable low sulfur liquid rubber composition according to claim 1, comprising between 10 and 80 weight percent of the at least one liquid polyene.

21. A cured rubber composition which is a cured reaction product of a heat curable low sulfur liquid rubber composition comprising:
  a) at least one liquid polyene comprising, as polymerized units, at least one comonomer having a carbon chain of at least four, the at least one polyene having a vinyl content of between 1 molar percent and 90 molar percent and a number average molecular weight of 800 g/mol to 70,000 g/mol;
  b) at least one organic peroxide;
  c) at least one coagent other than sulfur or a sulfur compound, adapted for crosslinking;
  d) 0 to less than 1% by weight of sulfur;
wherein the ratio of coagent phr to organic peroxide phr is less than 3.0:1;
and wherein, after curing, the cured rubber composition has:
  i. a loss factor (tan δ) greater than 0.4 when measured at 50 Hz frequency, 3 μm amplitude, and temperatures between −10° C. and 45° C.; and
  ii. a swelling ratio from 40% to 170% by weight, as measured by equilibrium weight gain in toluene at 25° C.

22. A method of producing a cured low sulfur rubber composition, the method comprising the steps of:
  A. preparing a heat curable low sulfur liquid rubber composition by combining at least:
    a) at least one liquid polyene comprising, as polymerized units, at least one comonomer having a carbon chain of at least four, the at least one liquid polyene having a vinyl content of between 1 molar percent and 90 molar percent and a number average molecular weight of 800 g/mol to 70,000 g/mol;
    b) at least one organic peroxide;
    c) at least one coagent other than sulfur or a sulfur compound, adapted for crosslinking;
    d) 0 to less than 1% by weight of sulfur;
  wherein the ratio of coagent phr to organic peroxide phr is less than 3.0:1; and
  B. heating the heat curable low sulfur liquid rubber composition at a temperature between 100° C. and 190° C. for between 5 minutes and 10 hours;

to obtain a cured low sulfur rubber composition having:
  i. a loss factor (tan δ) greater than 0.4 when measured at 50 Hz frequency, 3 μm amplitude, and temperatures between −30° C. and 45° C.; and
  ii. a swelling ratio from 40% to 170% by weight, as measured by equilibrium weight gain in toluene at 25° C.

* * * * *